A. J. LAUX.
INCUBATOR.
APPLICATION FILED APR. 21, 1916.

1,282,440.

Patented Oct. 22, 1918.
2 SHEETS—SHEET 1.

WITNESSES
Howard F. Costello
A. P. Hollingsworth

INVENTOR
Andrew J. Laux
BY
Richard Owen
ATTORNEY

A. J. LAUX.
INCUBATOR.
APPLICATION FILED APR. 21, 1916.

1,282,440.

Patented Oct. 22, 1918.
2 SHEETS—SHEET 2.

WITNESSES
Howard F Costello
H. P. Hollingsworth

INVENTOR
Andrew J. Laux
BY
Richard Bowen
ATTORNEY

UNITED STATES PATENT OFFICE.

ANDREW J. LAUX, OF SWANTON, OHIO.

INCUBATOR.

1,282,440.  Specification of Letters Patent.  Patented Oct. 22, 1918.

Application filed April 21, 1916. Serial No. 92,701.

*To all whom it may concern:*

Be it known that I, ANDREW J. LAUX, a citizen of the United States, residing at Swanton, in the county of Fulton and State of Ohio, have invented certain new and useful Improvements in Incubators, of which the following is a specification.

This invention relates to an incubator and has for its object to provide an apparatus necessitating the minimum amount of attention to keep it in operative condition, practically the only requirement being to care for the lamp and see that it is properly trimmed and filled and to turn the eggs at the proper time.

Another object of the invention is to provide in an apparatus of this kind a ventilating system in connection with the heating means whereby fresh air from without the incubator is directed first to and around the heater and thence upwardly to the top of the apparatus and into the egg chamber where spreading outwardly through the same the cooler foul air is forced out through escape openings at the bottom.

Another object of the invention is to provide means whereby the egg chamber is maintained at the proper temperature by optionally directing the air immediately surrounding the lamp through flues across the top of the egg chamber and thence outwardly thereby making use of this air, surcharged with odor and gases for heating purposes without permitting it to enter directly into the egg chamber and thus insuring a larger hatch of more healthy chicks than would be the case if this air was free to circulate through the egg chamber.

A further object of the invention relates to means for supplying the required moisture to the egg chamber by admitting to a flue delivering heated air thereinto, steam and moistened air from the top of a water heating chamber of annular form through which the products of combustion pass, said chamber having a pipe extending from its upper end and opening into the aforesaid hot air flue where the steam mingling with the entering air passes to the egg chamber and supply the necessary moisture to the air therein.

Other objects of the invention will be set forth in the following detailed description taken in connection with the accompanying drawings, in which.

Figure 1:
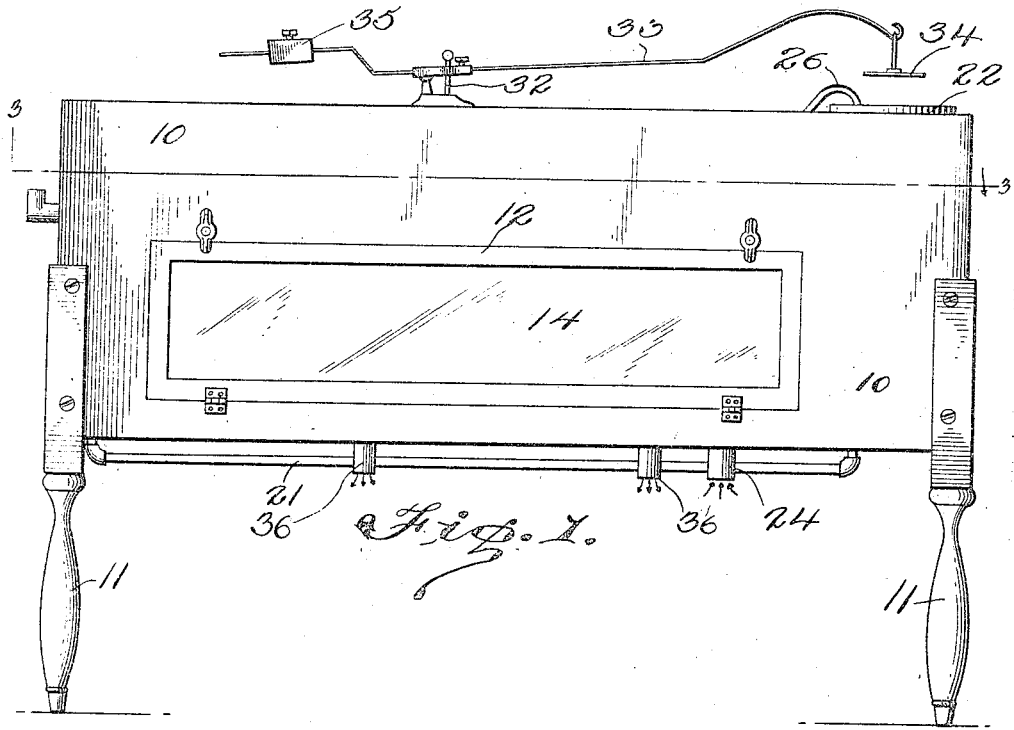
Figure 1 is a side elevation of the improved incubator.
Figure 2:
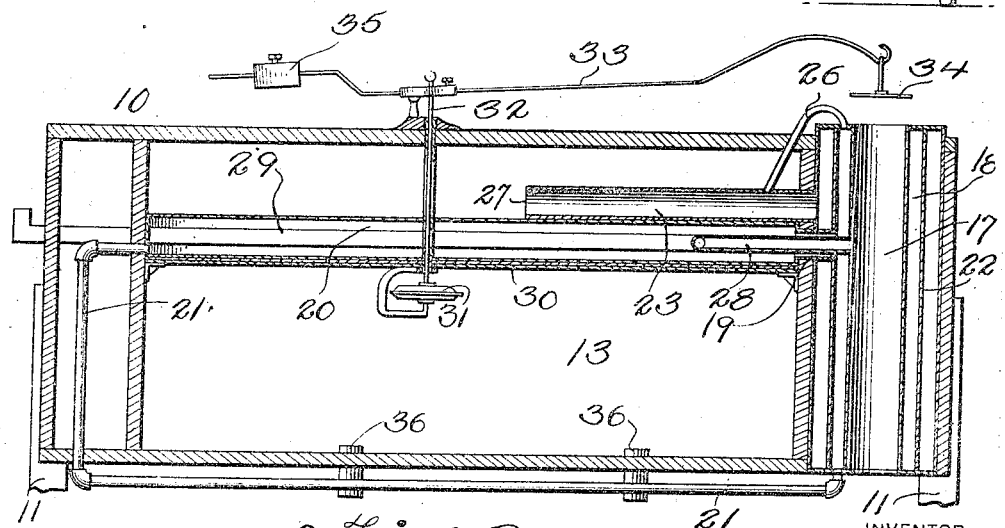
Fig. 2 is a vertical longitudinal section through the center of the same.

Referring to the drawings in which similar reference characters designate corresponding parts throughout the several views 10 indicates a casing of any convenient size mounted upon legs 11 and raised a suitable distance above the floor and has an opening in one side closed by a door 12 through which access may be had to the egg chamber 13 within. The door is shown as swinging downwardly and provided with a glass panel 14 to permit ready inspection of the contents within. Dead air spaces 15 at the sides and ends insure heat insulation, one of said spaces 16 containing the heating apparatus.

The heating apparatus comprises a flue 17 vertically disposed within the space 16 and opening through the top and bottom of the chamber, said flue itself being open at both ends into the lower of which the lamp for heating is inserted and through the top more or less of the products of combustion permitted to escape. Surrounding the flue 17 is an annular water heating chamber 18 that extends throughout the length of the flue 17 and opens through a pipe 19 into a rectangular tank 20 placed within the egg chamber near the top thereof and extending throughout the entire length. At its sides the tank is spaced from the side of the casing 10 to permit circulation of the air around the tank and through the egg chamber. From the end of the tank 20 opposite the inlet pipe 19 and at the bottom of the tank is a return pipe 21 that passes downwardly through the end dead air space 15 and thence along the under side of the casing 10 to the bottom of the water chamber 18 into which it is tapped. By this means proper circulation of the heated water is provided.

Figure 3:
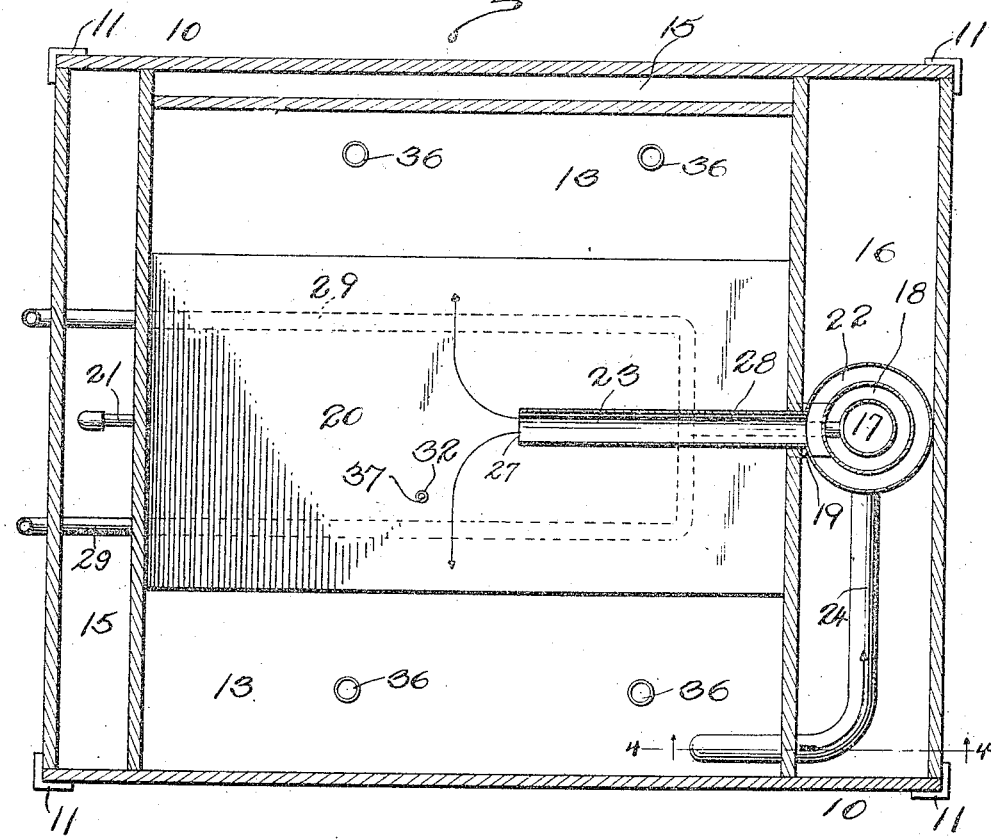
Fig. 3 is a horizontal sectional view on the line 3—3 of Fig. 1.
Figure 4:
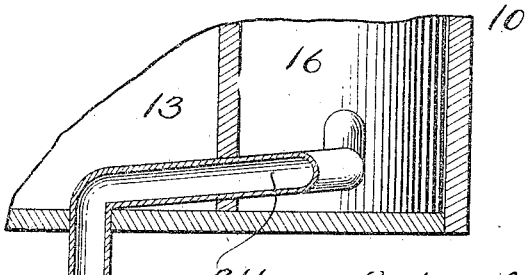
Fig. 4, is a detail sectional view on the line 4—4 of Fig. 3.

Surrounding the annular water chamber 18 is an air heating chamber 22 closed at the top and bottom and coincident in length with the water chamber. From the inner side of the air heating chamber 22 a hot air pipe 23 leads into the egg chamber immediately above the tank 20. This pipe extends into the chamber to substantially the middle thereof and through its open end delivers into said chamber fresh air heated in the air heater 22. For the purpose of maintaining a constant supply of fresh air in the air heating chamber 22 an inlet pipe 24 (see Figs. 3 and 4) opens into said chamber near the bottom thereof. This inlet pipe extends from its connection with the air heating chamber forwardly through the space 16 with a slight downward inclination and then through the bottom of the casing 10. The inlet pipe is shown in the drawings as entering the egg chamber 13 before passing through the bottom of the casing, but if desired, it may pass downwardly through the bottom of the space 16 and not enter the egg chamber.

A steam pipe 26 passes from the top of the water chamber 14 into the pipe 23 and through this pipe steam and moistened air pass from the top of the water chamber into the pipe 23, saturating more or less the heated air therein which passing into the egg chamber through the open end 27 supplies the necessary moisture to the air as it circulates around the eggs.

From the hot air flue 17 a subsidiary air heating pipe 28 passes into the tank 20 through the hot water pipe 19 for a short distance and then branching laterally, these branch tubes 29 continue through the tank 20 to its end and extend in parallel relation, passing out through the same end of the casing 10 where they turn upward and deliver through their open ends such products of combustion charged with gases that pass therethrough.

For the purpose of maintaining a constant temperature within the egg chamber, I mount therein just below the water tank 20 and insulated therefrom by a piece of non-conducting material 30, a thermostatic regulator 31 of any approved type. A rod 32 extends upwardly through the tank 20 and out of the casing 10 where it is connected at its upper end to a substantially horizontal lever 33, one end of which has suspended therefrom a damper 34 adapted when lowered to practically close the upper open end of a hot air flue 17. Balancing this end of the lever and damper 34 is an adjustable weight 35 mounted on the opposite end of the lever 33.

In operating this apparatus trays of any approved type filled with eggs are placed in a well known manner in the egg chamber 13. The water chamber 18, tank 20 and return pipe 21 are filled with water nearly to the top of the water chamber. A lamp of sufficient size to generate the necessary heat is inserted a greater or less distance into the bottom opening of the hot air flue 17. The passage upward through the flue 17 of the products of combustion and the heated air around the lamp raises the temperature of the water and causes it to circulate through the tank 20, return pipe 21, and water chamber 18. At the same time the heated water raises the temperature of the air in the air heating chamber 22 and the air in turn passes through the pipe 23 into the egg chamber forcing out the foul and cool air therein through the discharge opening 36 in the bottom of the casing, fresh air entering through the inlet pipe 24 passes into the air chamber to take the place of that which has passed through the pipe 23. Steam and any air that may be at the top of the water chamber 18 will pass through the pipe 26 into the pipe 23 and moisten the air therein.

Under normal conditions with the temperature in the air chamber standing at 103° F. the damper 34 will be maintained in position shown in the drawings and the greater part of the heated air in the flue 17 passes outward through the open upper end thereof. Should however the temperature in the egg chamber fall below 103°, the thermostat 31 will move so as to cause the rod 32 to slide downward through its protecting casing 37 and lower the end of the lever 33 carrying the damper 34, said damper closing the upper end of the flue 17 and causing the greater quantity of heated air in said flue to pass through the tubes 28 and their branches 29. This heated air in addition to the heat supplied by water in the tank 20 and air entering through pipe 23, will raise the temperature in the egg chamber once more and when it has reached 103° the thermostat 31 responding thereto will lift the lever 33 and the damper 34 on the end thereof, thus opening the flue 17 and permitting free escape of the heated air and products of combustion lessening thereby the amount passing through the tubes 28 and 29.

As is evident from the description and the illustration the foul heated air in the flue 17 cannot by any possibility enter the egg chamber as under normal conditions this air escapes through the top of the flue while all the air entering the egg chamber must pass through the inlet 24 at the bottom thereof, the air therefore within the egg chamber will always be pure and fresh provided the apparatus is placed in a room to which pure air always has access.

From the foregoing description taken in connection with the accompanying drawings, it is thought that the construction and operation of the device will be clearly understood, and while I have herein shown and described one specific embodiment of my invention, I do not wish to be limited thereto except for such limitations as the claims may import.

I claim:

1. In an incubator, a casing, a vertical hot-air flue in one end of said casing open at its upper and lower ends in which latter end a heating element is adapted to be placed, a water heater inclosing said flue, an air heating chamber surrounding said water heater and closed at its top and bottom, an egg chamber within said casing, a hot air pipe leading from the upper end of said air chamber into the egg chamber and delivering heated air into said egg chamber, a steam pipe extending from the top of the water heater and opening into the hot air pipe, and a cold air inlet pipe for conveying air into the lower end of the heating chamber from a point distant therefrom.

2. In an incubator, a casing containing an egg chamber, a vertical hot-air flue in one end of said casing open at its upper and lower ends in which latter end a heating element is adapted to be placed, a water chamber surrounding the hot-air flue and extending from end to end of said flue, a hot water tank within the egg chamber extending from end to end thereof but spaced from the sides of said chamber, a hot water pipe connecting said hot water chamber with one end of said tank, a return pipe connecting the other end of the tank with the bottom of the hot water chamber, an air heating chamber surrounding the hot water chamber and closed at its upper and lower ends, a cold air pipe opening into the lower end of the air heating chamber to deliver fresh air received at a distance from the heating element into the lower end of said chamber, a hot air pipe leading from the top of said hot-air chamber into the egg chamber for delivering fresh heated air thereinto, and a steam pipe leading from the top of said hot water chamber into the hot-air pipe for introducing steam and heated air thereinto.

3. In an incubator, a casing having a vertical wall near one end for dividing said casing into an egg chamber and a dead air space, a vertical hot-air flue passing through said dead air space from the bottom to the top of the casing and open at its upper and lower ends in which latter end the heating element is adapted to be placed, a water chamber surrounding said air flue from end to end thereof, an air heating chamber inclosing the water chamber, and closed at its upper and lower ends, a fresh-air inlet pipe opening into the bottom of the air heating chamber and receiving air through the bottom of the casing at a distance from the heating element within the hot-air flue, a horizontal hot-water tank within the egg chamber near the top thereof and spaced at its sides from the walls of the chamber, an inlet pipe connecting said hot water tank with the water chamber surrounding the hot-air flue, a return pipe from the opposite end of said water tank to the bottom of the water chamber, a hot-air pipe extending from the air heating chamber over the hot water tank to a point substantially midway between the ends of the casing, a relief steam pipe extending from the top of the hot-water chamber into said hot-air pipe, a tube for conveying hot-air direct from the heating flue into the hot-water tank then dividing and passing through said tank and out of the casing, a temperature regulator within the egg chamber below the hot-water tank and provided with a vertical stem passing outwardly through the top of the casing, and a damper suitably mounted on the casing for controlling the outlet opening in the hot-air flue by the variations of temperature within the casing.

In testimony whereof I affix my signature in presence of two witnesses.

ANDREW J. LAUX.

Witnesses:
V. J. BROWN,
HARRY E. THURSTON.